United States Patent [19]

Bleha, Jr. et al.

[11] 4,114,991
[45] Sep. 19, 1978

[54] VISIBLE-TO-INFRARED CONVERTER LIGHT VALVE

[75] Inventors: William P. Bleha, Jr., Carlsbad; Jan Grinberg, Los Angeles, both of Calif.

[73] Assignee: Hughes Aircraft Company, Culver City, Calif.

[21] Appl. No.: 753,253

[22] Filed: Dec. 22, 1976

[51] Int. Cl.² .............................................. G02F 1/13
[52] U.S. Cl. .................................. 350/338; 350/341; 350/342; 350/347
[58] Field of Search .............. 350/160 LC; 250/213 R

[56] References Cited

U.S. PATENT DOCUMENTS

| | | | |
|---|---|---|---|
| 3,939,346 | 2/1976 | Tutihashi | 250/330 |
| 3,976,361 | 8/1976 | Fraas et al. | 350/160 LC |

*Primary Examiner*—Edward S. Bauer
*Attorney, Agent, or Firm*—Donald C. Keaveney; W. H. MacAllister

[57] ABSTRACT

There is disclosed a reflective type liquid crystal light valve means for converting a visible wavelength dynamic image to an infrared wavelength dynamic image. The device employs an infrared reflecting and visible transmitting indium-tin-oxide film which is external to the liquid crystal layer and active films and which also serves as a conductive electrode for the device. In operation, a visible image is transmitted through a visible transmitting faceplate and through this ITO film to a photosensor to modify its impedance. An infrared projection beam is transmitted through a second infrared transmissive faceplate, through the liquid crystal means and the photosensor to the IR reflective dichroic film and thence back through the rest of the liquid crystal cell for projection.

8 Claims, 2 Drawing Figures

VISIBLE-TO-INFRARED CONVERTER LIGHT VALVE

BACKGROUND OF THE INVENTION

Simulation of complex infrared radiation patterns from missiles for the purpose of evaluating and designing infrared detectors for tracking such missiles requires a capability of creating high resolutions dynamic infrared images of a controlled or predetermined pattern and pattern history. There is presently no good means available by which this can be accomplished. The present invention is a novel configuration of a reflection mode liquid crystal light valve for use as a visible-to-infrared dynamic image converter whereby the more easily controlled and observed visible image pattern may be used to produce an infrared image pattern for such purposes. The device employs an infrared reflecting and visible transmitting indium-tin-oxide film which also serves as a conductive electrode for the device.

The general development of light valve technology is illustrated by such patents as U.S. Pat. No. 3,824,002 issued to Terry D. Beard on July 16, 1974 and U.S. Pat. No. 3,976,361 issued to Lewis M. Fraas et al on Aug. 24, 1976, both of which are assigned to the assignee of the present application. Previous efforts to use such light valves for conversion of visible-to-infrared images have attempted to operate in the transmissive mode whereas such light valves are in fact inherently reflective devices. It has heretofore been thought that to convert such transmissive light valves to reflection mode, which is advantageous for increased liquid crystal retardation, would require a dielectric mirror. For operation in the 8-14 micron infrared region, this would require thick quarter-wave films, and thus a large total mirror thickness. This could result in increased surface roughness and stress failure of the mirror. The indium-tin oxide dichroic mirror configuration used in the present invention permits a high infrared reflectivity and visible transmission in a film less than 0.3 microns thick.

It is an object of the present invention to provide a liquid crystal light valve suitable for converting a visible wavelength dynamic image to an infrared wavelength dynamic image.

It is a further object of this invention to provide such a light valve using a thin dichroic conductive electrode film which is transmissive to visible wavelength radiation and reflective for infrared radiation and which may also serve as an electrode for the device.

SUMMARY OF THE INVENTION

These objects are achieved by a reflective liquid crystal light valve means for converting a visible wavelength dynamic image to an infrared wavelength dynamic image in accordance with the present invention. The light valve comprises a first faceplate of visible wavelength transmissive material positioned to receive the visible wavelength image. On this faceplate there is deposited a dichroic conductive electrode film, a variable impedance photosensor means, a liquid crystal layer, a second electrode and a second opposed faceplate. A voltage is applied between the dichroic film electrode and the second electrode and is divided between the photosensor means and the liquid crystal layer in accordance with the magnitude of the photosensor impedance at any given point in space or time. This impedance is varied by the visible image transmitted through the first faceplate and the dichroic film which is transmissive to visible wavelength radiation and reflective to infrared. An infrared projection beam is supplied through the second faceplate and transmitted through the liquid crystal and photosensor means to the reflective dichroic film where it is reflected back through the photosensor means, the liquid crystal and the second faceplate for projection. The infrared beam is modulated, for example, by changes in its polarization state produced by changes in the liquid crystal molecules responsive to changes in the voltage across the liquid crystal layer resulting from photosensor impedance changes induced by the incident visible image. Of course it will be understood that dynamic scattering can also be used.

BRIEF DESCRIPTION OF THE DRAWINGS

These and other objects, features and advantages of the invention will be more fully apparent from the detailed description below taken in conjunction with the accompanying drawings wherein like reference characters refer to like parts throughout and in which.

DETAILED DESCRIPTION OF THE DRAWINGS

Figure 1:
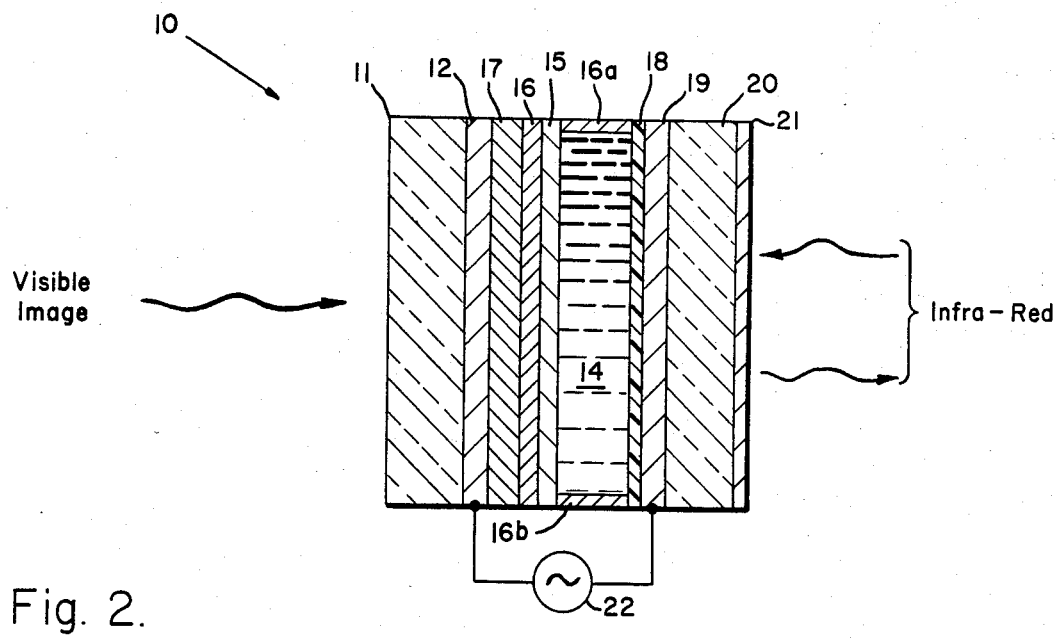
FIG. 1 is a sectional view of a first embodiment of the light valve.

Turning now to the drawing and in particular to FIG. 1 thereof, there is shown a cross-sectional view of a first embodiment of the visible-to-infrared light valve converter. It will be understood that this sectional view is taken through the thinnest dimension of a generally square or rectangular flat packaging arrangement of the type shown in the Beard Pat. No. 3,824,002. The first faceplate 11 of the valve may be of glass, fiberglass or any other suitable visible light-transmissive substance. On this faceplate 11 there is deposited an indium-tin-oxide dichroic mirror member 12. On this mirror member in turn is deposited a photosensor means which may comprise the two layers 16 and 17 forming a photojunction of the type disclosed in U.S. Pat. No. 3,976,361 referenced above. Thus, the layer 17 may comprise a cadmium sulphide photoconductor having a graded defect center density in accordance with the teaching of that patent and the layer 16 may be cadmium telluride or any other equivalent arrangement taught in the above-noted reference. Of course it will also be understood that other equivalently functioning junctions or photosensors can be used and the details thereof do not per se form a part of this invention.

Adjacent to and superimposed on the photosensor means 16–17 is a silicon dioxide layer 15 which is used to produce the desired alignment of the liquid crystal molecules in the layer 14 adjacent thereto in order to provide the desired field-effect birefringent mode of operation of the liquid crystal cell in accordance with principles which again do not per se form a part of the present invention and which are known in the art. Reference is made, for example, to U.S. Pat. No. 3,694,053 to F. J. Kahn for a description of the field-effect birefringent mode of liquid crystal operation. The liquid crystal layer is indicated in FIG. 1 as layer 14 and may comprise any of the materials disclosed in the Kahn patent. Adjacent to its other side is a second silicon dioxide alignment film 18 which is supported on an infrared and visible transmitting indium-tin-oxide film 19 which in turn is mounted on a second faceplate 20 which is positioned in opposed parallel relationship to the first faceplate 11. The two faceplates form the major supporting elements for the package which is completed by the spacer members 16a and 16b holding the two faceplates and their respective films in spaced opposed relationship to form a chamber in which the liquid crystal layer 14 is contained. The second faceplate member 20 should consist of an infrared transmissive substance such as germanium or compounds such as "IRTRAN-2". On the outer surface of the second faceplate 20 is a thin anti-reflection film 21. A source of AC voltage, 22, is connected between the film 19 and the film 12 so that its voltage output is divided across the photosensor, the alignment films and the liquid crystal layer. The proportion of the voltage which appears across the liquid crystal layer at any point in space or time of course depends on the impedance of the photosensor at that point which in turn is varied or modulated in accordance with the visible input image supplied through faceplate 11 and film 12 to the photosensor element.

Figure 2:
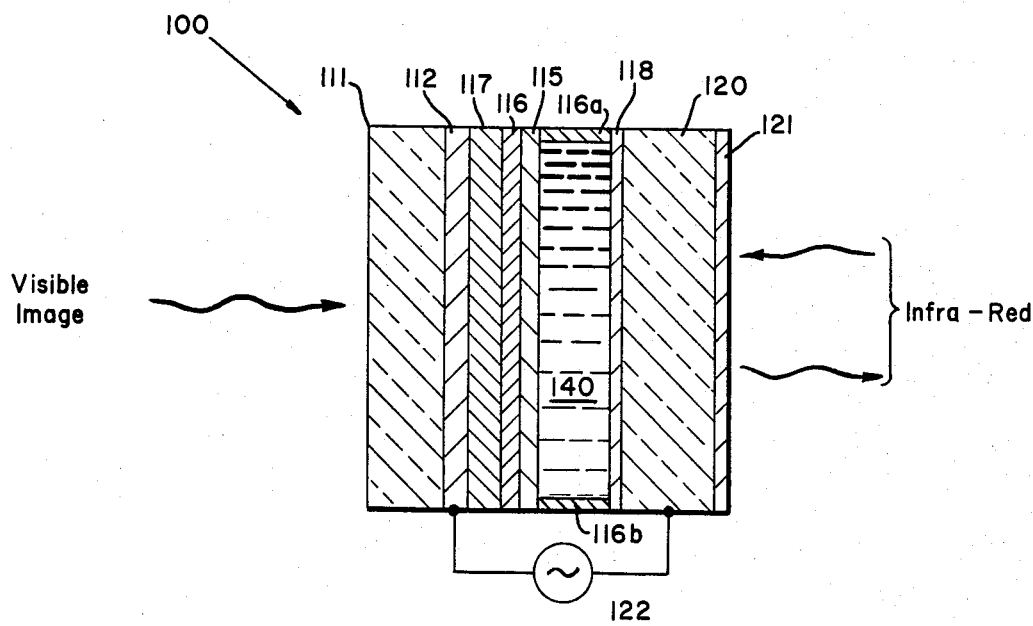
FIG. 2 is a sectional view of a second embodiment of the light valve.

The second embodiment shown in FIG. 2 is very similar to that shown in FIG. 1 and corresponding parts are indicated by reference characters which have been increased by 100 with respect to the reference character used in FIG. 1. Thus, faceplate 111 in FIG. 2 corresponds to faceplate 111 in FIG. 1 and the second opposed faceplate 120 in FIG. 2 corresponds to faceplact 20 in FIG. 1. All of the elements in FIG. 2 are in fact the same as those in faceplate 1 except that the species of FIG. 2 eliminates the indium-tin-oxide conductive electrode 19 of FIG. 1 by using a second faceplate 120 which is not only transmissive of infrared radiation but is also electrically conductive in its material characteristics. For a one centimeter thick faceplate or counter-electrode 120 the resistivity must be less than 1,000 ohms per centimeter to provide a sufficient conductivity. This can be achieved with intrinsic germanium which has a resistivity of 50 ohms per centimeter, or it can be achieved with lightly doped silicon or doped zinc selenide, all three of which are also transmissive to infrared. Thus, use of the substrate material as the electrode improves the insertion loss of the light valve of FIG. 2 with respect to that of the embodiment of FIG. 1 but is not a necessary characteristic.

The key to the operation of the novel light valve is the dichroic indium-tin-oxide mirror 12 that transmits in the visible but reflects efficiently through the infrared. The film 12 deposited on the visible transmitting glass or fiber optic faceplate 11 is a conductive electrode film of indium-tin-oxide having a thickness greater than 0.3 microns which is deposited such that there is an oxygen deficiency which results in a semi-metallic conductivity. Under these conditions the reflectivity of the film approaches unity as the incident photon frequency becomes less than the plasma frequency. For indium-tin-oxide, doped in the range of $10^{20}$ donors/cm$^2$, the plasma frequency corresponds to an optical wavelength of 1.5 microns. Thus, for a wavelength greater than 1.5 microns, the film becomes highly reflective. Thus, the conductive electrode acts also as the dichroic mirror allowing simultaneously high visible transmission and high infrared reflection.

The next two films, 17 and 16 in FIG. 1 and 117 and 116 in FIG. 2, comprise the photosensor means, the film 17 being typically a cadmium-sulphide layer and the film 16 being a cadmium-telluride layer with the two films having a combined thickness of approximately 15 microns. This photosensor is used to gate the voltage to the liquid crystal corresponding to the visible input image. This film is transparent in the infrared out to approximately 14 microns. The cadmium-telluride film 16 may be approximately 2 microns thick and acts to form a heterojunction on the cadmium-sulphide surface. The cadmium telluride is transparent out to 30 microns in the infrared. The next layer, 15, is a thin (less than 0.2 microns) amorphous insulating overcoat of silicon dioxide that is used for electro-chemical passivation and liquid crystal alignment techniques such as ion beam etching of the layer 15 in grazing fashion in order to provide for alignment of the liquid crystal molecules adjacent to it to facilitate the field-effect mode birefringence effect. The use of silicon dioxide for layer 15 is feasible for wavelengths out to 5 microns in the infrared. For large wavelengths another amorphous insulator film such as silicon nitride must be used. It appears possible that silicon dioxide could be used out to 14 microns if it were deposited in a very thin layer such that the absorption peaks at 9.3, 9.5 and 12.5 microns are minimized.

The next layer 14 (or 114) is the infrared modulating liquid crystal layer which has a thickness less than 12 microns. The infrared absorbption spectrum of the liquid crystal shows scattered absorption peaks at varying intensity. In general, there are large regions of high transmittance out to 15 microns, particularly in the biphenol compound.

As noted above, the counter-electrode 19 and opposing substrate 20 which provides confinement of the liquid crystal and the front electrical contact can be made in two species or configurations. The first species, shown in FIG. 1, consists of the infrared transmissive substrate 20 which may be formed from "IRTRAN-2", or from germanium or silicon which are transparent to infrared out to 15 microns, a thin infrared transmissive film 19 of conductive indium-tin-oxide, and another passivating alignment insulator film 18 next to the liquid crystal. The indium-tin-oxide film 19 differs from the indium-tin-oxide 12 which is used as an infrared reflector by virtue of the deposition techniques used. To achieve high infrared transmission, a very thin film (less than 0.03 microns) is used and the film is oxygen compensated to reduce the electron donor concentration. These conditions result in an infrared transmission greater than 80% at 2.5 microns with an estimated transmission greater than 50% at 14 microns. The sheet resistivity of 500 ohms per square is still usable for light valve applications. The configuration shown in FIG. 2 eliminates the film 19, as noted above, by using the conductivity of the infrared transmissive substrate material comprising substrate 120 for the front electrode. As noted, this front electrode can be intrinsic germanium, lightly doped silicon, or doped zinc selenide.

The general principles of operation of the light valve are similar to those described in U.S. Pat. No. 3,976,361 referenced above. The main difference is that the output reflecting mirror for the light valve is external to the active films of the device. In the visible projection AC light valve of the above-noted patent, the dielectric mirror and light blocking layer separate the photoconductor from the liquid crystal. This is necessary to prevent the visible projection light from uniformly exciting the photoconductor. In the infrared operation, the photoconductor is transparent to infrared so that the output beam can traverse the photoconductor and be reflected from the back plane of the photoconductor which is adjacent to the indium-tin-oxide reflective film 17 or 117. Again, since it does not influence the resolution of the light valve in this position, the mirror can also be made conductive. It should be pointed out that the use of an external dichroic dielectric mirror or an external metal mirror in place of the indium-tin-oxide reflector is not deemed to be an equivalent or suitable approach. In the case of the dichroic dielectric mirror, the dielectric mirror would be greater than 6 microns thick for equivalent operation at 14 microns in the infrared which would produce a non-specular surface because of increased crystallite scattering on this mirror surface could present additional problems.

The metal mirror approach would require that the imaging light enter the light valve from the same side as the infrared. Thus, the cadmium telluride would have to be replaced with a visible transparent junction forming layer. In addition, the use of fiber-optic coupling for faceplate 11 would not be possible. Finally, the infrared optical system would be complicated by the use of a dichroic beam splitter to insert the imaging light into the light valve.

It is thus seen that there has been provided a liquid crystal light valve means for converting a visible wavelength dynamic image to an infrared wavelength dynamic image suitable for use in simulating missile tailpipe configurations or for any general application.

What is claimed is:

1. Liquid crystal light valve means for converting a visible wavelength dynamic image to an infrared wavelength dynamic image, said light valve means comprising:
   (a) a first faceplate of visible wavelength transmissive material having one side thereof positioned to receive a visible wavelength image;
   (b) a dichroic conductive electrode film on the other side of said faceplate, said film being transmissive in the visible wavelength region but reflective in the infrared wavelength region;
   (c) a second faceplate of infrared wavelength transmissive material positioned in spaced opposed relationship to said first faceplate;
   (d) a layer of liquid crystal material and means for confining said layer between said first and second faceplates;
   (e) means to apply a voltage across said liquid crystal layer;
   (f) variable impedance photosensor means for modulating said voltage spatially and temporally responsively to incidence thereon of said visible wavelength image, said photosensor means being positioned to receive said visible wavelength image transmitted through said film; and
   (g) said photosensor means being transparent to infrared radiation and said liquid crystal being responsive to variation of the voltage applied across it to vary the polarization of infrared radiation transmitted through it whereby infrared radiation transmitted through said second faceplate, said liquid crystal layer, and said photosensor is reflected from said dichroic film back through said photosensor, said liquid crystal layer and said second faceplate and is polarization modulated responsively to the voltage across said liquid crystal layer in both of its transits therethrough.

2. A device as in claim 1 wherein said means to apply a voltage across said liquid crystal layer comprises:
   (a) a voltage source;
   (b) means to connect one side of said voltage source to said dichroic conductive electrode film on said first faceplate;
   (c) a second dichroic conductive electrode film on said second faceplate, said film being transmissive in both the visible and the infrared wavelength regions; and,
   (d) means to connect the other side of said voltage source to said film on said second faceplate.

3. A device as in claim 2 wherein said second dichroic conductive electrode film on said second faceplate is an indium-tin-oxide film having a thickness of less than 0.03 microns to afford high infrared transmissivity and being oxygen compensated to reduce the electron donor concentration.

4. A device as in claim 1 wherein said means to apply a voltage across aid liquid crystal layer comprises:
   (a) a voltage source;
   (b) means to connect one side of said voltage source to said dichroic conductive electrode film on said first faceplate; means to connect the other side of said voltage source to said second faceplate, the material of said second faceplate being both electrically conductive and optically transmissive to both visible and infrared wavelength energy.

5. A device as in claim 4 wherein the material of said second faceplate is selected from the group comprising intrinsic germanium, lightly doped silicon, or doped zinc selenide, the resistivity of said material being less than 1,000 ohms per centimeter for each one centimeter thickness of the faceplate.

6. A device as in claim 1 wherein said first faceplate comprises a fiberglass plate composed of fiberglass strands having their longitudinal axes perpendicular to said dichroic conductive electrode film.

7. A device as in claim 1 wherein said dichroic conductive electrode film on said first faceplate comprises an indium-tin-oxide film having a thickness greater than 0.3 microns and deposited to have an oxygen deficiency which results in a semi-metallic conductivity.

8. A device as in claim 7 wherein said indium-tin-oxide film is doped in the range of $10^{20}$ donors/cm$^2$ to produce a plasma frequency corresponding to an optical wavelength of 1.5 microns, the reflectivity of said film approaching unity as the incident photon frequency becomes less than the plasma frequency wherein the film becomes highly reflective for photons having a wavelength greater than 1.5 microns.

* * * * *